(12) United States Patent
Gusmano

(10) Patent No.: US 9,930,217 B2
(45) Date of Patent: *Mar. 27, 2018

(54) METHOD AND APPARATUS FOR AUTHORIZING A PRINT DEVICE TO PERFORM A SERVICE USING A PORTABLE MEMORY DEVICE

(71) Applicant: Xerox Corporation, Norwalk, CT (US)

(72) Inventor: Donald J. Gusmano, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,756

(22) Filed: Dec. 29, 2016

(65) Prior Publication Data

US 2017/0310853 A1    Oct. 26, 2017

Related U.S. Application Data

(63) Continuation of application No. 15/135,664, filed on Apr. 22, 2016, now Pat. No. 9,552,181.

(51) Int. Cl.
*H04N 1/44*     (2006.01)
*G06F 12/14*    (2006.01)
(Continued)

(52) U.S. Cl.
CPC ....... *H04N 1/4426* (2013.01); *G06F 12/1408* (2013.01); *H04L 63/0853* (2013.01);
(Continued)

(58) Field of Classification Search
CPC ...... G06F 3/1238; G06F 21/602; G06F 21/44; G06F 3/1272; G06F 3/1222
See application file for complete search history.

(56) References Cited

U.S. PATENT DOCUMENTS 6,583,888 B1   6/2003   Salgado et al.
7,533,335 B1   5/2009   Sawicki et al.
(Continued)

FOREIGN PATENT DOCUMENTS

EP    1615159 A1    1/2006

OTHER PUBLICATIONS

Information about Related Patents and Patent Applications, see section 6 of the accompanying Information Disclosure Statement Letter, which concerns Related Patents and Patent Applications.

(Continued)

*Primary Examiner* — Ming Hon
(74) *Attorney, Agent, or Firm* — Fox Rothschild LLP

(57) ABSTRACT

A document printing system may include a print engine, a controller and a communication port. The communication port can read a portable memory device, which stores an electronic secure file for authorizing the print engine. The portable memory device may store data such as the creation date for the electronic secure file. The portable memory may also store the device identification code and/or the vendor identification code. The electronic secure file may also store the creation date for the file itself, and the device identification code, the vendor identification code, or a balance amount. The system may authorize a print engine by comparing the data in the electronic secure file and data stored on the portable memory device. If the comparison of data finds a mismatch, the system may determine that the print engine is not authorized; or that the service is authorized if otherwise.

20 Claims, 7 Drawing Sheets

(51) Int. Cl.
*H04L 29/06* (2006.01)
*H04N 1/34* (2006.01)

(52) U.S. Cl.
CPC ............... *H04N 1/34* (2013.01); *H04N 1/444* (2013.01); *G06F 2212/1052* (2013.01); *H04N 2201/0094* (2013.01); *H04N 2201/3274* (2013.01); *H04N 2201/3281* (2013.01)

(56) References Cited

U.S. PATENT DOCUMENTS

| | | | |
|---|---|---|---|
| 7,726,556 | B2 | 6/2010 | Beabes et al. |
| 8,416,446 | B2 * | 4/2013 | Yoon ................ H04N 1/32101 |
| | | | 358/1.15 |
| 8,874,489 | B2 | 10/2014 | Abhyanker |
| 8,984,296 | B1 | 3/2015 | Young |
| 2005/0010609 | A1 * | 1/2005 | Katoh ................. G06F 21/6218 |
| 2006/0143477 | A1 * | 6/2006 | Stevens, III .......... H04L 9/3236 |
| | | | 713/193 |
| 2006/0181729 | A1 * | 8/2006 | Kuribara .............. G06F 21/608 |
| | | | 358/1.14 |
| 2007/0101152 | A1 | 5/2007 | Mercredi et al. |
| 2007/0133033 | A1 * | 6/2007 | Mizutani ............... G06F 21/608 |
| | | | 358/1.14 |
| 2007/0150738 | A1 * | 6/2007 | Kawai .................... G06F 21/33 |
| | | | 713/176 |
| 2008/0180747 | A1 * | 7/2008 | Tsuzuki ............. H04N 1/00347 |
| | | | 358/1.16 |
| 2009/0092279 | A1 * | 4/2009 | Tabata ................... G06K 9/036 |
| | | | 382/100 |
| 2009/0168095 | A1 * | 7/2009 | Watanabe ............. G06F 21/608 |
| | | | 358/1.15 |
| 2009/0268224 | A1 * | 10/2009 | Takahashi ............ G06F 21/608 |
| | | | 358/1.14 |
| 2010/0141997 | A1 * | 6/2010 | Suzuki .................. G06F 3/1292 |
| | | | 358/1.15 |
| 2010/0332699 | A1 * | 12/2010 | Genda .................. G06F 13/385 |
| | | | 710/63 |
| 2013/0215446 | A1 * | 8/2013 | Imai ..................... H04N 1/4426 |
| | | | 358/1.13 |
| 2014/0351838 | A1 | 11/2014 | Dunmore et al. |

OTHER PUBLICATIONS

U.S. Appl. No. 15/135,664, filed Apr. 22, 2016, Method and Apparatus for Authorizing a Print Device to Perform a Service.

* cited by examiner

METHOD AND APPARATUS FOR AUTHORIZING A PRINT DEVICE TO PERFORM A SERVICE USING A PORTABLE MEMORY DEVICE

CROSS REFERENCE TO RELATED APPLICATIONS

This patent document is a continuation of U.S. patent application Ser. No. 15/135,664, filed Apr. 22, 2016 ("the '664 Application"), the contents of which are incorporated entirely.

BACKGROUND

This disclosure relates to authorization of services and particularly to authorizing a service using a portable memory device to authorize a device, such as a print device, to perform a service such as a document printing service.

Traditional on-demand service solutions require specific hardware to initiate a device service. For example, in on-demand print solutions, a currency acceptor device may be connected to the foreign device interface (FDI) port of a multi-function peripheral (MFP), or a card reader is connected to the MFP, to enable reading of an external medium. These solutions usually require expensive hardware and/or a complex backend system to handle the payment authorization process. Further, solutions with a card reader may be vulnerable to fraud as a hacker that attaches special equipment to the card reader can duplicate the information embedded in the external medium.

This document describes a system that may address the issues described above.

SUMMARY

In one embodiment, a document printing system may include a print engine, a controller coupled to the print engine and a communication port in electrical communication with the controller. The communication port can read a portable memory device, which stores an electronic secure file for authorizing a print engine. The portable memory device may also store data such as the device identification code, the vendor identification code, the creation date for the electronic secure file. The electronic secure file may also store the device identification code, the vendor identification code, the creation date for the file itself, as well as a balance amount. The controller of the document printing system is capable of verifying the validity of the electronic secure file on the portable memory device and authorizing the print engine. In authorizing the print engine, the controller will compare the data in the electronic secure file with the data stored on the portable memory device. In one embodiment, the controller will compare the device identification code in the electronic secure file with the device identification code stored on the portable memory device, compare the vendor identification code in the electronic secure file with the vendor identification code stored on the portable memory device, and compare the creation date in the electronic secure file with the creation date stored on the portable memory device. If all of the comparisons produce a match, then the controller will determine that the electronic secure file on the portable memory device is valid, and then authorize the print engine.

In one embodiment, the electronic secure file may be encrypted, thus the controller will decrypt the electronic secure file using an encryption key or a password prior to extracting data from the electronic secure file. In one embodiment, the portable memory device may have a file system, and the device identification code, the vendor identification code and the creation date for the electronic secure file may be stored in the file system and can be accessed by a user. Optionally, the electronic secure file may include an instantiation code, and in determining that the print engine is authorized, the controller may additionally compare one or more instantiation codes in a memory of the document printing system with the instantiation code in the electronic secure file.

In one embodiment, upon authorizing the print engine, the document printing system may display a service home screen to receive a print related job from the user, release the print related job and start the print related job. Additionally, the system may estimate the cost of a print job and update the balance amount in the electronic secure file based on the estimated cost before starting the print job. In one embodiment, the system may calculate the actual cost of the print job upon its completion and compare with the estimated cost. If the actual cost is different from the estimated cost, the system will adjust the balance amount and update the electronic secure file on the portable memory device with the adjusted balance amount.

In one embodiment, to update information in the electronic secure file, the system will create a new electronic secure file on the portable memory device; retrieve from the portable memory device the creation date for the new electronic secure file; set the device identification code and the vendor identification code in the new electronic secure file with the device identification code and the vendor identification code retrieved from the portable memory device, respectively; set the creation date and the balance amount in the new electronic secure file with the creation date for the new electronic secure file retrieved from the portable memory device and the new balance amount, respectively; and delete the electronic secure file from the portable memory device while keeping the new electronic secure file.

In one embodiment, a method of implementing a print related job in the document printing system may include retrieving from the portable memory device the device identification code, the vendor identification code and the creation date for the electronic secure file; reading the electronic secure file from the portable memory device, and extracting from the electronic secure file the device identification code, the vendor identification code and the creation date for the electronic secure file; comparing the device identification code, the vendor identification code and the creation date retrieved from the portable memory device with the device identification code, the vendor identification code and the creation date extracted from the electronic secure file, respectively; determining that the print engine is authorized if the device identification code retrieved from the portable memory device matches the device identification code extracted from the electronic secure file, the vendor identification code retrieved from the portable memory device matches the vendor identification code extracted from the electronic secure file and the creation date for the electronic secure file retrieved from the portable memory device matches the creation date extracted from the electronic secure file, and that the print engine is not authorized if otherwise.

In one embodiment, the method for implementing the print related job may include activating the portable memory device by creating the electronic secure file on the portable memory device; retrieving the device identification code, the vendor identification code and the creation date associated with the electronic secure file from the portable memory device; setting the balance amount of the electronic secure file; and setting the device identification code, the vendor identification code and the creation date of the electronic secure file with the device identification code, the vendor identification code and the creation date associated with the electronic secure file retrieved from the portable memory device, respectively.

In one embodiment, the method for implementing the print related job may also include replenishing the portable memory device by retrieving the device identification code, the vendor identification code from the portable memory device; reading the electronic secure file stored on the portable memory device and extracting the device identification code, the vendor identification code and the balance amount; determining a new balance amount based on the balance amount of the electronic secure file and a replenishment amount; creating a new electronic secure file on the portable memory device; retrieving from the portable memory device the creation date associated with the new electronic secure file; setting the device identification code and the vendor identification code of the new electronic secure file with the device identification code and the vendor identification code retrieved from the portable memory device, respectively; setting the creation date and the balance amount of the new electronic secure file with the creation date for the new electronic secure file and the new balance amount, respectively; and deleting the electronic secure file from the portable memory device while keeping the new electronic secure file.

In some embodiments, a document printing system may include a portable memory device having a non-transitory storage medium that stores thereon a device identification code, a vendor identification code, an electronic secure file and a creation date for the electronic secure file. The electronic secure file may store a device identification code, a vendor identification code and a creation date. The system may also include a print engine, a controller coupled to the print engine, and a communication port in electrical communication with the controller and configured to read the portable memory device. The controller may be configured to authorize the print engine by retrieving from the portable memory device the device identification code, the vendor identification code and the creation date for the electronic secure file; reading the electronic secure file from the portable memory device, and extracting the device identification code, the vendor identification code and the creation date for the electronic secure file; comparing the device identification code, the vendor identification code and the creation date retrieved from the portable memory device with the device identification code, the vendor identification code and the creation date extracted from the electronic secure file, respectively; and determining that the print engine is authorized if the device identification code retrieved from the portable memory device matches the device identification code extracted from the electronic secure file, the vendor identification code retrieved from the portable memory device matches the vendor identification code extracted from the electronic secure file and the creation date for the electronic secure file retrieved from the portable memory device matches the creation date extracted from the electronic secure file, and that the print engine is not authorized if otherwise; and causing the print engine to perform a print related job if the print engine is authorized, otherwise displaying an error message.

DETAILED DESCRIPTION

Figure 1:
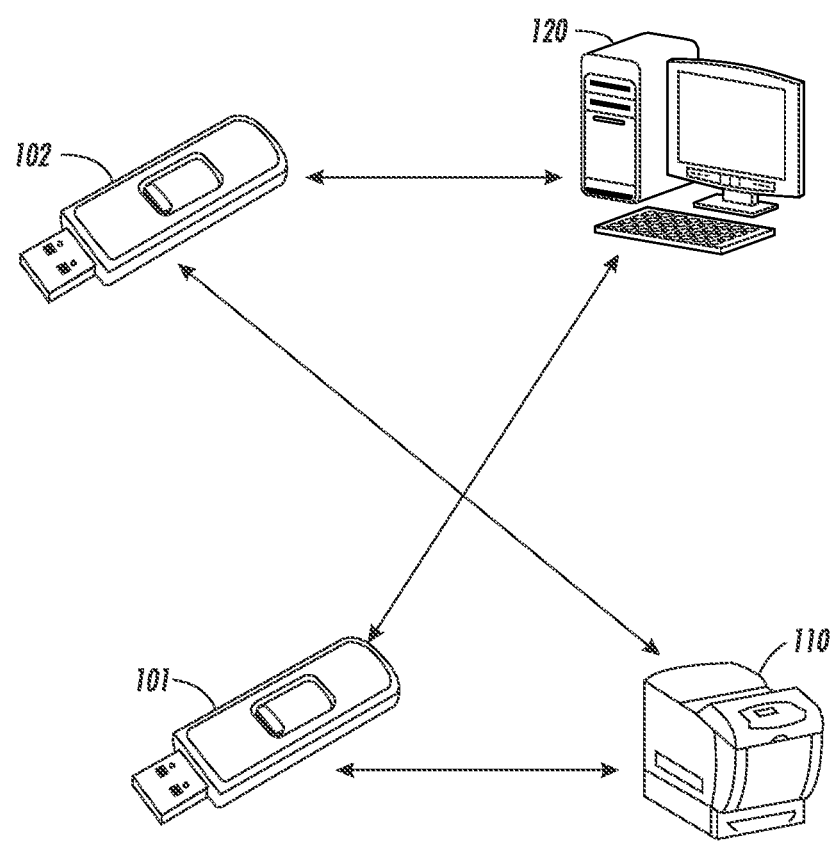
FIG. 1 illustrates an open loop system for service authorization according to one embodiment.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "portable memory device" refers to a portable device have non-transitory storage medium capable of storing data, such as a USB flash drive, a SD or microSD card, a portable hard disk, a portable media player or any other storage device that has such storing capability. In various embodiments, the portable memory device does not need to include a processor. The portable memory device may or may not have a file system.

The term "document printing system" or "document printing service" refers to a system or service for performing print related jobs, in particular, printing, copying, facsimile, transmitting or receiving, and/or image scanning on a physical document.

The term "print engine" or "print device" refers to a machine or device for performing print related jobs, in particular, printing, copying, facsimile, transmitting or receiving, and/or image scanning on a physical document.

The term "electronic secure file" refers to a piece of data stored on the portable memory device to be read by a portable memory device reader. The electronic secure file may be a file in a file system or a block or blocks of data stored in any format. The electronic secure file may be encrypted.

The term "device identification code" refers to an identification code stored on a portable memory device and unique to the portable memory device, such as a serial number. The device identification code may be unique across other portable memory devices manufactured by a specific manufacturer or all manufacturers. The device identification code may also be unique per user or per system. The device identification code may be modifiable by the user or may not be modifiable. A device identification code can have various segments, such as a segment containing a vendor identification code, a segment containing a model identification code, and a segment with a code that is unique to the individual device.

The term "vendor identification code" refers to an identification code unique to the maker of the portable memory device.

The term "instantiation code" or "instantiation number" refers to a unique code representing the instantiation of the system or software application that is used to write the electronic secure file on the portable memory device.

The term "balance amount" refers to an available amount of a resource required for rendering a service. For example, for a print related job, the balance amount may refer to the resource required to finish a print related job, such as a number of pages, a number of credits based on a credit formula or an amount of money.

Each of the terms "computing device," "activation device" and "replenishing device" refers to an electronic device such as a desktop computer, a laptop, a tablet, a smartphone, and other electronic device that includes one or more processors and non-transitory, computer-readable memory. The memory may contain programming instructions in the form of a software application or firmware that, when executed by the processor, causes the device to be in communication with the portable memory device and read or update the electronic secure file on the portable memory device.

The embodiments described in this document provide service authorization using a portable memory device in various service systems.

With reference to FIG. 1, an open loop service system is shown. The service system 110 is capable of reading a portable memory device 101, 102 for authorizing the use of the service system. The open loop system refers to a service system in which the device that provides a service is not physically or communicatively connected to a transaction processing system. For example, the portable memory device can be activated by a transaction processing system 120 such as a server or any computing device of a user who can add a balance amount on the portable memory device to be used for authorizing a service. At the service delivery system 110, the activated portable memory device 101, 102 can be plugged into and read by the service system, which will check the validity of the portable memory device and authorize the service if the system determines that the portable memory device is valid.

In one embodiment, the portable memory device can be a USB flash drive, a SD or microSD card or other storage medium. The service delivery system 110 can be a document printing system that includes a multi-function peripheral (MFP), which allows user to make copies, print, fax and scan documents. For example, the document printing system may have a print engine that enables user to print, copy or scan documents. In one embodiment, the portable memory device 101, 102 is used to authorize a user to use the document printing system by authorizing the print engine.

The portable memory device 101, 102 may include an electronic secure file for the purposes of authorizing a service. The electronic secure file may store a device identification code, a vendor identification code and a balance amount. In one embodiment, the electronic secure file may additionally store an instantiation code. Additionally, the electronic secure file may store an account number that a unique number for each user, a creation date/timestamp when the electronic secure file is created on the portable memory device, a purchase amount or replenishment amount that a user has purchased for authorizing a service, and a transaction history that logs a history of all service transactions made with the portable memory device.

In one embodiment, the above listed information is stored in the electronic secure file. Additionally, some or all of this information, such as the device identification code and vendor identification code may be stored on the portable memory device as well. In one embodiment, when the portable memory device is manufactured, the device identification code and vendor identification code are coded by the manufacturer and stored onto the portable memory device. In one embodiment, this information is stored in a designated secure sector of the portable memory device and cannot be modified by the user via formatting, but can be retrieved by the user such as via an operating system that accesses the memory device. For example, if the portable memory device is a USB flash drive, a user may read the USB flash drive from a computer system and retrieve the device identification code and vendor identification code from the USB flash drive. In another embodiment, the USB flash drive may have a file system, such as NTFS that can be accessed by a computer. As the electronic secure file is created on the file system of the USB flash drive, a creation date or timestamp is automatically created by the file system. A user accessing the file system on the portable memory device would be able to retrieve the creation date of the electronic secure file.

In the open loop system, there are some security concerns in using the portable memory device for authorizing a service. For example, the electronic secure file may have been copied from one USB flash drive to another; the original electronic secure file may have been copied, compromised and reloaded onto the same USB flash drive; or the electronic secure file may have been created by a different application or instance of the application that is used to create the electronic secure file.

Figure 2:
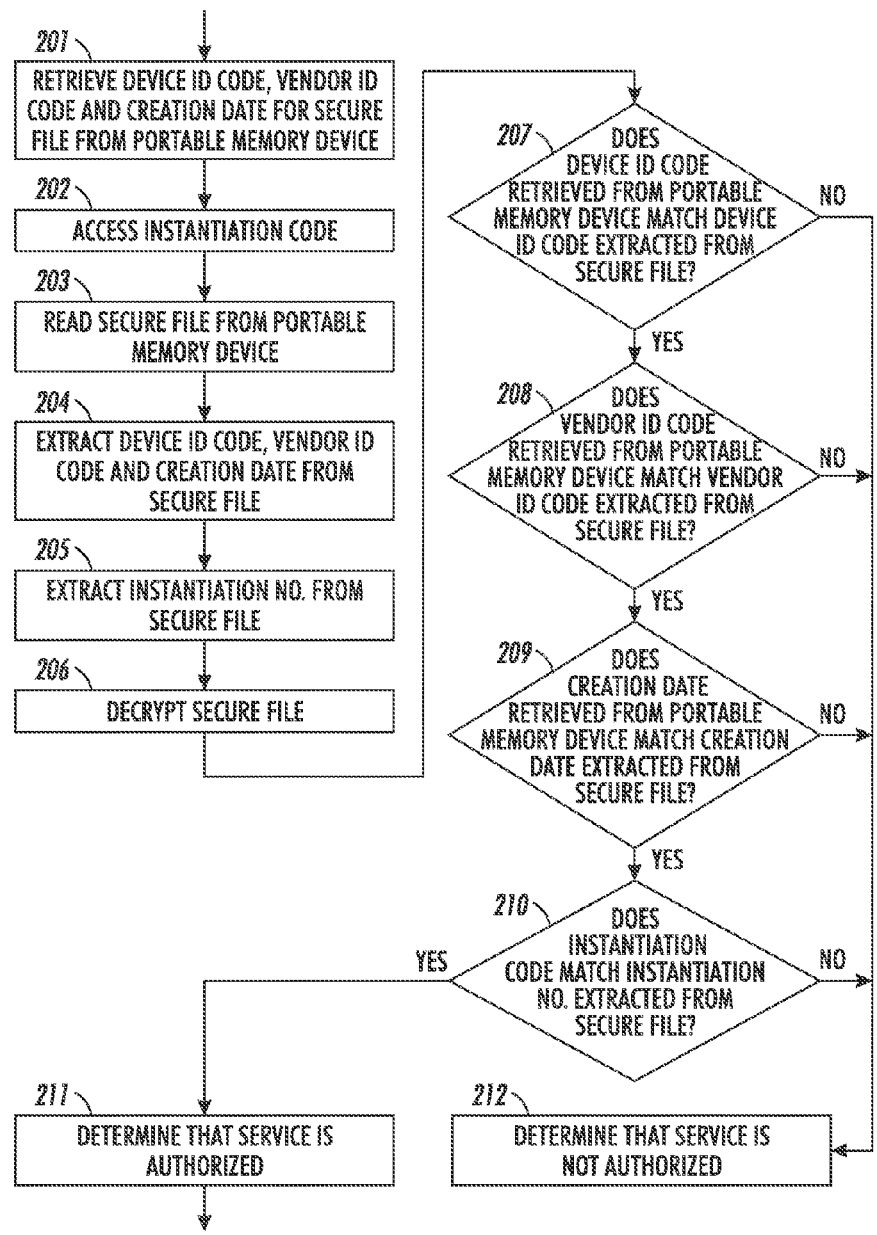
FIG. 2 illustrates a diagram of service authorization using a portable memory device according to one embodiment.

With reference to FIG. 2, various embodiments that address the above security concerns are described in detail. In one embodiment, each of the device identification code and vendor identification code is a unique number or alpha-numeric code for each USB flash drive for each vendor. Upon creation of the electronic secure file the application will retrieve the device identification code and the vendor identification code of the USB flash drive that the electronic secure file is being written to and store the device identification code and the vendor identification code in the electronic secure file. The application may also retrieve the creation date for the electronic secure file from the USB flash drive. In the open loop system, at validation and authorization, the service system will retrieve the device identification code, the vendor identification code and the creation date for the electronic secure file from the portable memory device 201, read the electronic secure file from the portable memory device 203, extract the device identification code, the vendor identification code and the creation date from the electronic secure file 204, and perform one or more comparisons. The system will compare the device identification code retrieved from the portable memory device with the device identification code extracted from the electronic secure file 207. The system may also compare the vendor identification code retrieved from the portable memory device with the vendor identification code extracted from the electronic secure file 208. The system may also compare the creation date retrieved from the portable memory device with the creation date extracted from the electronic secure file 209. If any of these comparisons fails, i.e. the two values under the comparison do not match, then the system may determine that the electronic secure file on the portable memory device is not validated and the service is not authorized 212. Otherwise, the system may continue comparing all of the data pairs in 207, 208 and 209. If all of these comparisons succeed, then the system may determine that the portable memory device is validated and the service is authorized 211.

In another embodiment, or additionally, in order to achieve higher accuracy of validation, the creation date or timestamp for the electronic secure file can be written at a resolution of a second or 1/10 of a second. Even if the file system of the portable memory device can handle only up to a second, as long as the digit indicating the time units smaller than a second is not rounded to zero, the comparison of creation date can still achieve accuracy because the odds of someone installing a file on the USB flash drive at precisely the right time, i.e. at the very second, is extremely small.

Alternatively and/or additionally, an instantiation code can also be used for added security. The instantiation code is a unique number representing the instantiation of the system or software application used to write the electronic secure file on the portable memory device. This code can be accessible to the user who activates the portable memory device and the service system. For example, a user may want to purchase a gift from a service provider (e.g. a document printing service) to be used for rendering future services. Upon purchase of the gift, the user may be provided a software application by the service provider for activating the gift on any medium of user's choice such as on a portable memory device. The user may also be provided with an instantiation code associated with the software application. This instantiation code is unique to the software application provided for the user and can be verified by the service delivery system. Upon user is activating the portable memory device, the software application will store the instantiation code in the electronic secure file to be used for validation and authorization of service.

With further reference to FIG. 2, at validation and authorization by the service system, the system will additionally receive an instantiation code from the user who wants to use the service or access a list of available instantiation codes 202, extract the instantiation code stored in the electronic secure file 205, and compare the extracted instantiation code with the one or more instantiation codes the system has available 210. If the instantiation code extracted from the electronic secure file does not match any of the instantiation codes the system has available, then the system may determine that the electronic secure file on the portable memory device is not validated, and the service requested is not authorized 212. On the other hand, if none of the comparisons in steps 207, 208, 209 and 210 fails, then the system may determine that the electronic secure file on the portable memory device is validated and that the service is authorized 211.

Figure 3:
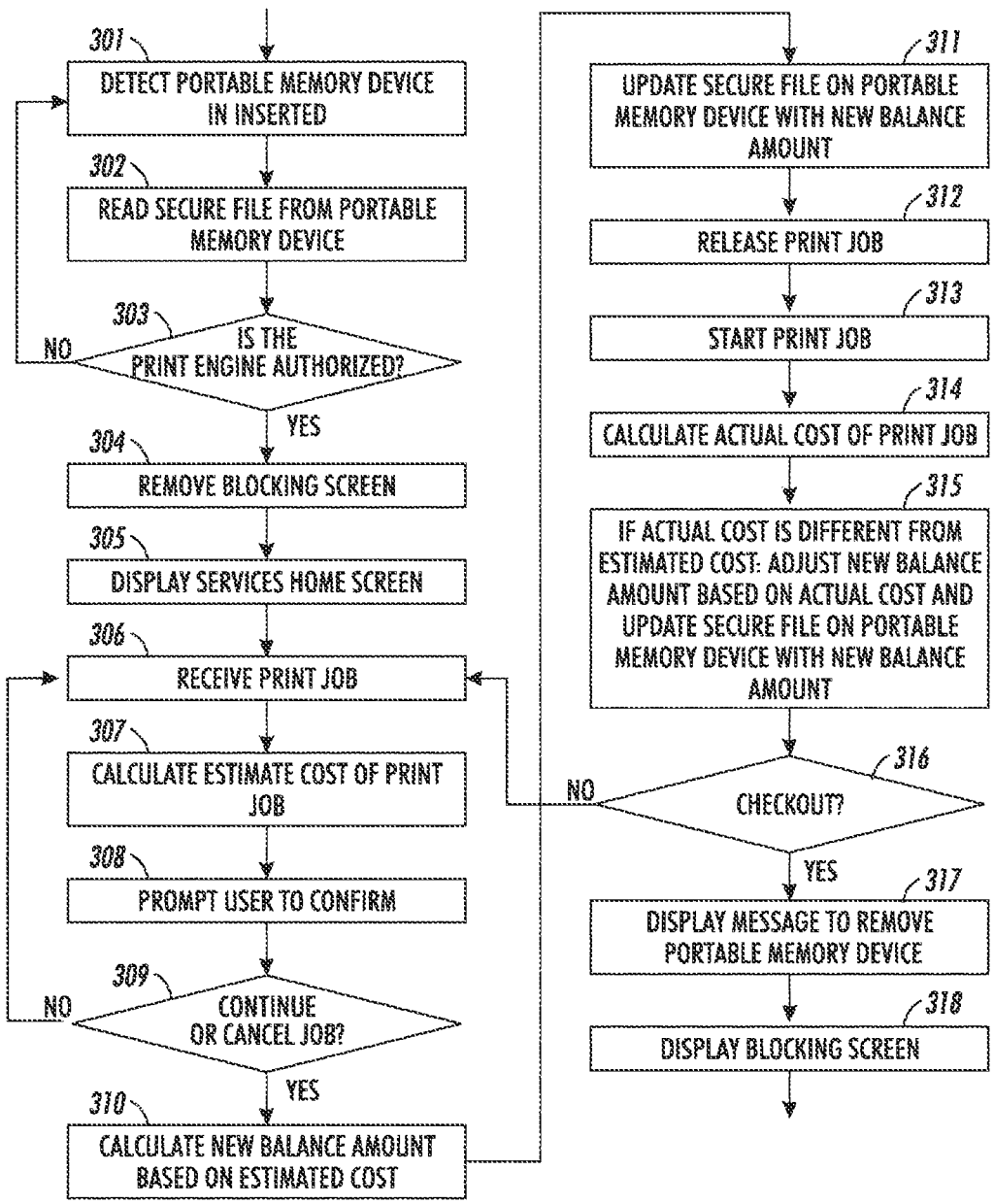
FIG. 3 is a diagram of a document printing system employing print service authorization according to one embodiment.

With reference to FIG. 3, a service authorization in a document printing system using the aforementioned portable memory device is described. In one embodiment, the document printing system has a print engine, a controller coupled to the print engine and used to authorize the print engine, a communication port that is in electrical communication with the controller and is capable of receiving and reading a portable memory device such as via a plug-in port. The communication port may thus be part of the print device, or it may be part of a computing device that is networked with the print device. In authorizing the print engine, the controller of the system first detects that a portable memory device is inserted in the communication port 301. The controller will then read the electronic secure file stored on the portable memory device and determine whether the electronic secure file on the portable memory device is validated, which method was disclosed above with respect to FIG. 2. If the system determines that the electronic secure file on the portable memory device is validated, then the print engine is authorized 303.

Upon determining that the print engine is authorized 303, the system may cause a display device of the print device (or of the networked computing device) to display appropriate screens to the user to receive a print related job. For example, before the print engine is authorized, the system may be in an idle mode and may display a blocking screen to prevent users from accessing and using the system. When the print engine is authorized, the system may remove the blocking screen and display a service home screen on the display device, such as a graphical user interface, to receive a print job from the user 306, then release the print job 312 and start the print job 313. When the authorization of the print engine fails, the system may display an error message. Alternatively and/or additionally, the print engine may also be authorized to receive and start other print related jobs such as scanning and facsimile, etc.

In one embodiment, or additionally, before releasing and starting the job, the system may calculate an estimated cost of the print job 307. For example, the estimated cost of the job may be the number of pages to print, or the number of points for completing the job according to a point conversion formula, or the dollar amount for completing the job according to a money conversion formula. The point conversion formula refers to converting the resource needed to complete a print job to a point system, whereas the money conversion formula refers to converting the resource to a dollar amount. The system may display the estimated cost and prompt the user to confirm the estimated cost 308. The system may allow the user to continue or cancel the print job 309.

In one embodiment, or additionally, the controller may extract the balance amount from the electronic secure file on the portable memory device, and upon user confirmation 309, deduct the estimated cost from the balance amount to calculate a new balance amount 310. In another embodiment, other deduction method may be used, such as by applying a discount. The controller may then cause the system to update the balance amount in the electronic secure file 311 before starting the print job. This deduction method may have drawbacks. For example, in the event that the user terminates the print job before it is finished, the user may be charged more than the cost of the services it receives. In another example, the estimated cost may not be accurate or needs to be adjusted for complex print jobs, or in the event of unexpected service problems such as paper jams or network interruptions that may require the print engine to repeat part of the print job. In one embodiment, after the completion of a print job, the controller will calculate the actual cost of the print job 314 and determine whether it is the same as the estimated cost. If the actual cost is not the same as the estimated cost, the system may adjust the new balance amount based on the actual cost and update the electronic secure file on the portable memory device with the adjusted new balance amount 315. Upon user completing the use of the printing system or unplugging the portable memory device from the system, the system may go back to the idle mode and display the blocking screen. Alternatively and/or additionally, the balance amount and estimated cost may also apply to other print related jobs such as scanning and facsimile, etc.

Figure 4:
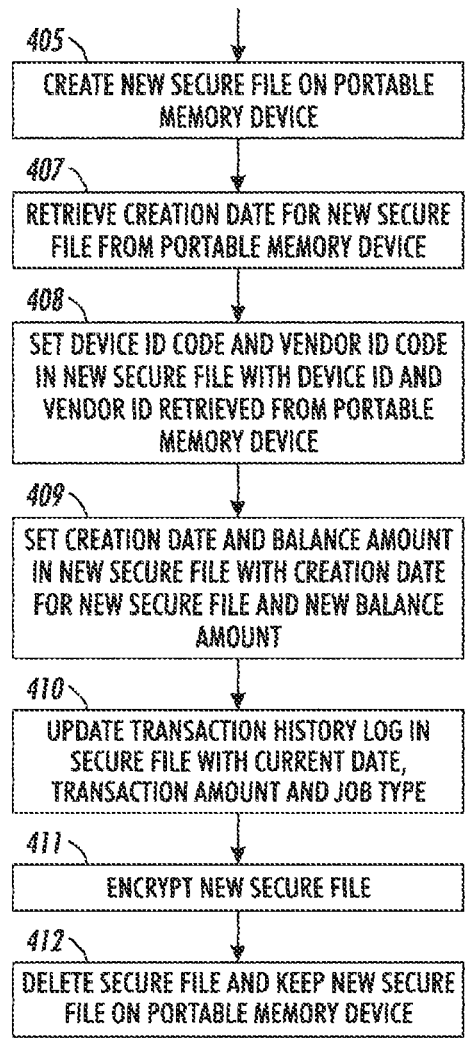
FIG. 4 is a diagram of updating a portable memory device according to one embodiment.

With reference to FIG. 4, how a system updates the electronic secure file with the new balance amount on the portable memory device is described. Instead of directly modifying the electronic secure file, the system will create a new electronic secure file on the portable memory device 405, retrieve the creation date for the new electronic secure file from the portable memory device 407, store the same device identification code and the vendor identification code for the portable memory device in the new electronic secure file 408. The system will also store the creation date for the new electronic secure file and the new balance amount in the new electronic secure file 409. In one embodiment, the system may copy over the transaction history from the current (or old) electronic secure file to the new electronic secure file 410. Additionally, the system may update the information in the transaction history with other information such as the current date, the transaction amount and the job type 410. After updating the new electronic secure file, the system will delete the old electronic secure file and keep the new electronic secure file on the portable memory device 412.

Figure 5:
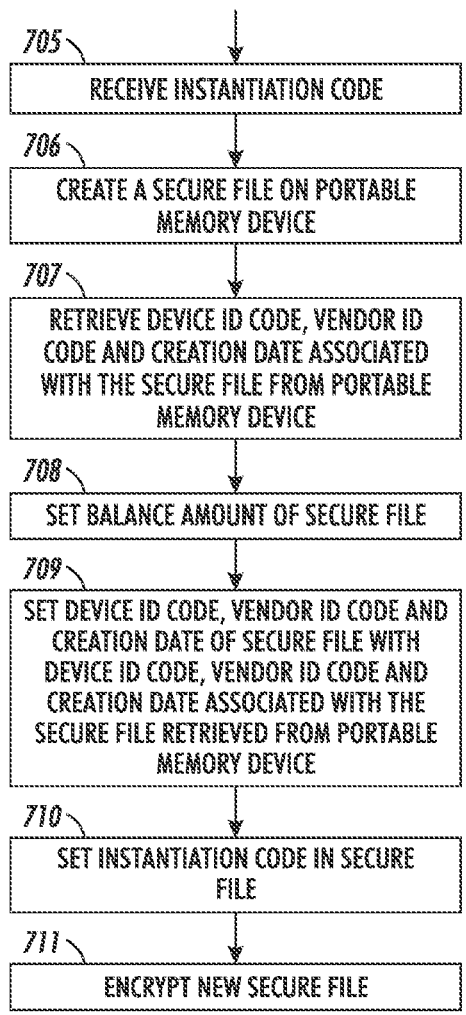
FIG. 5 is a diagram of activating a portable memory device for service authorization according to one embodiment.

With reference to FIG. 5, embodiments for activating a portable memory device are described. In one embodiment, the system will create an electronic secure file on the portable memory device 706, and retrieve the device identification code, the vendor identification code and the creation date for the electronic secure file from the portable memory device 707. If the portable memory device has a file system and the electronic secure file is stored in the file system, the system may access the file system on the portable memory device to retrieve the creation date or timestamp for the electronic secure file. During activation of the portable memory device, the system may receive a purchase amount from the user activating the portable memory device. The system may set the balance amount of the electronic secure file with the purchase amount 708. The system may further store other information in the electronic secure file such as the device identification code, the vendor identification code and the creation date for the electronic secure file and set these values with the device identification code, the vendor identification code and the creation date retrieved from the portable memory device 709.

In one embodiment, or additionally, the system activating the portable memory device may be a system or software application provided by the service provider or gift card issuer, who may provide an instantiation code to the user of the software application or encode the instantiation code in the application. In one embodiment, in activating the portable memory device, the system may receive an instantiation code 705 and store the instantiation code in the electronic secure file 710.

Figure 6:
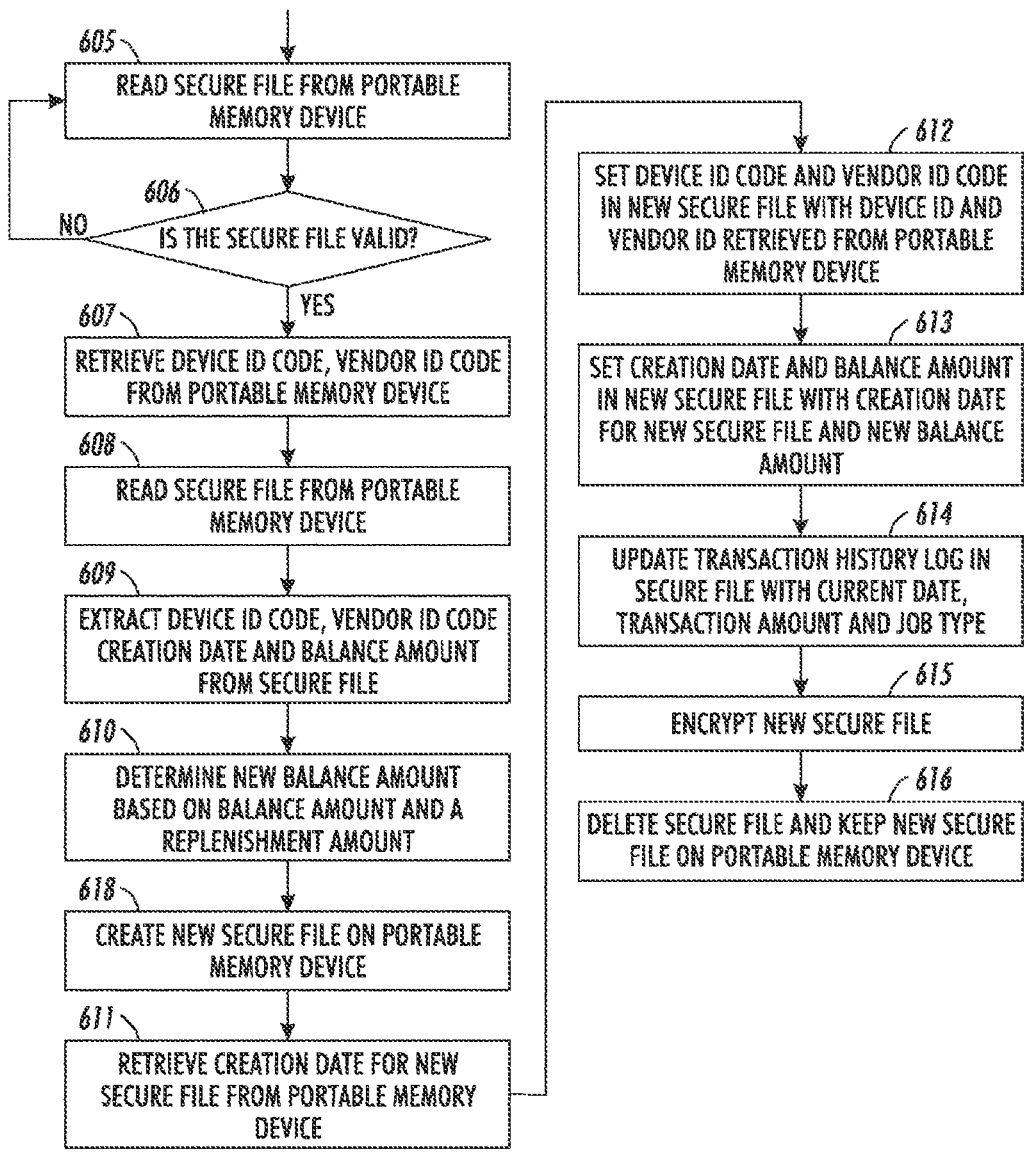
FIG. 6 is a diagram of replenishing a portable memory device for service authorization according to one embodiment.

With reference to FIG. 6, embodiments for replenishing a portable memory device are described. In one embodiment, the system will read the existing electronic secure file on the portable memory device 605 and check its validity. The validity checking has already been described above in the descriptions with respect to FIG. 2. If the system determines that the electronic secure file on the portable memory device is valid, the system may retrieve the device identification code and the vendor identification code from the portable memory device 607. The system may also read the electronic secure file 608 and extract the device identification code, the vendor identification code and the balance amount from the electronic secure file 609. The system may also determine a new balance amount based on a replenishment amount and the balance amount extracted from the electronic secure file 610 and update the new balance amount in the electronic secure. For example, the system may add the replenishment amount to the balance amount to calculate the new balance amount. In another example, the system may additionally apply a discount or credit depending on the replenishment amount, ongoing coupon, store credits or other promotions.

In updating the new balance amount in the electronic secure file, in one embodiment, the system may first create a new secure file on the portable memory device 618 and retrieve the creation date for the new electronic secure file from the portable memory device 611. Similar to activating the portable memory device with respect to FIG. 5, the system may also set the values in the electronic secure file with the device identification code and the vendor identification code retrieved from the portable memory device 612. The system may also set the balance amount and the creation date in the electronic secure file with the new balance amount and the creation date for the new electronic secure file 613. Additionally, the system may copy over the transaction history from the current (or old) electronic secure file to the new electronic secure file 614. Additionally, the system may update the information in the transaction history with the current date and new transaction amount 614. After updating the new electronic secure file, the system will delete the old electronic secure file and keep the new electronic secure file on the portable memory device 616.

Various systems and methods may be derived from the descriptions disclosed in this document. In one embodiment, the electronic secure file on the portable memory device may be encrypted, for which the system may use an encryption key or a password to encode the contents of the electronic secure file after creating the file, thus prevent unauthorized viewing or extracting the contents of the file. Various encryption schemes such as symmetric key encryption, public key encryption, can be used. If the electric secure file is encrypted, the system will decrypt the file with an encryption key or a password, by decoding the encrypted contents, prior to extracting the contents of the file. Thus, the system may need to decrypt the electronic secure file when extracting data from it and encrypt the file when creating or updating it.

Although an open loop service system is shown in FIG. 1, the portable memory device and service authorization system may also operate in a closed loop system. For example, in a closed loop system, the MFP may be capable of communicating with the transaction processing system, and the transaction processing system and service delivery system can be combined into a single system. The closed loop system will be able to track the usage of the portable memory device thus making detection of fake or altered electronic secure file simpler. For example, a user's balance amount can be kept in the transaction processing system or the service delivery system and the user would not be able to fraudulently add or alter the balance amount in the electronic secure file on the portable memory device.

Figure 7:
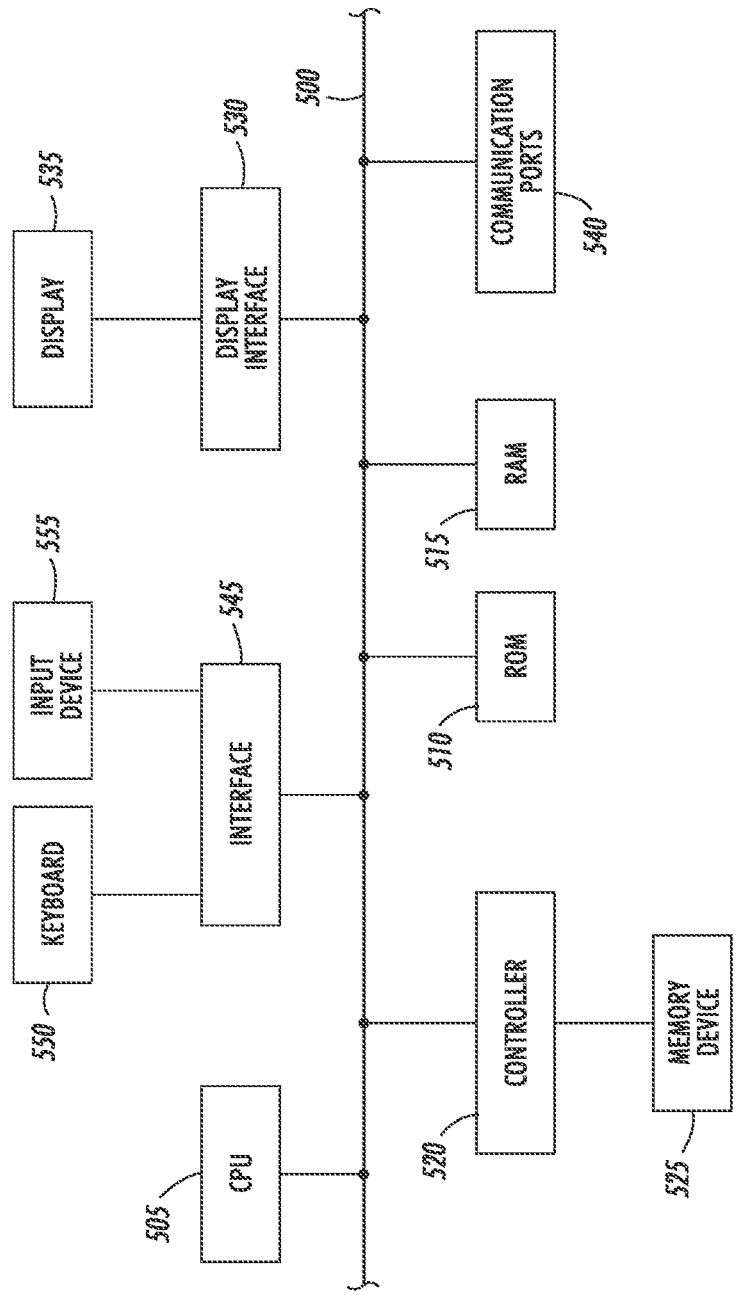
FIG. 7 is a block diagram of elements of a computing device on which the various systems and methods in this document could be implemented.

FIG. 7 depicts an example of internal hardware that may be included in any of the electronic components of the system, the user electronic device or another device in the system such as the system 110, 120 (in FIG. 1). An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors or processor cores in one or more processors.

Read only memory (ROM), random access memory (RAM), flash memory, hard drives and other devices capable of storing electronic data constitute examples of memory devices 510. A memory device may include a single device or a collection of devices across which data and/or instructions are stored.

An optional display interface 530 may permit information from the bus 500 to be displayed on a display device 545 in visual, graphic or alphanumeric format. An audio interface and audio output (such as a speaker) also may be provided. Communication with external devices may occur using various communication ports or devices 540 such as a portable memory device reader/writer, a transmitter and/or receiver, an antenna, an RFID tag and/or short-range or near-field communication circuitry. The communication device 540 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a remote control, a pointing device, a video input device (camera) and/or an audio input device (microphone). Various methods of activation, validation and/or authorization described in this document may be performed by the central processing device 505 or a controller 520.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A method of authenticating a print related job comprising:
in a system having a print engine and a controller:
reading, by the controller, a portable memory device, wherein the portable memory device stores thereon an electronic secure file associated with a creation date and a device identification code,
retrieving, by the controller, from the portable memory device the creation date for the electronic secure file and the device identification code,
reading, by the controller, the electronic secure file from the portable memory device, and extracting a creation date and a device identification code from the electronic secure file,
comparing, by the controller, the creation date retrieved from the portable memory device with the creation date extracted from the electronic secure file,
comparing, by the controller, the device identification code retrieved from the portable memory device with the device identification code extracted from the electronic secure file, and
determining that the print engine is authorized if:
the creation date for the electronic secure file retrieved from the portable memory device matches the creation date extracted from the electronic secure file, and
the device identification code retrieved from the portable memory device matches the device identification code extracted from the electronic secure file, otherwise determining that the print engine is not authorized.

2. The method of claim 1, wherein:
the portable memory device further stores thereon a vendor identification code; and
the method further comprises:
retrieving, by the controller, the vendor identification code from the portable memory device,
extracting, by the controller, a vendor identification code from the electronic secure file,
comparing the vendor identification code retrieved from the portable memory device with the vendor identification code extracted from the electronic secure file, and
determining that the print engine is authorized only if, additionally, the vendor identification code retrieved from the portable memory device matches the vendor identification code extracted from the electronic secure file, otherwise determining that the print engine is not authorized.

3. The method of claim 1 further comprising:
accessing one or more instantiation codes in a memory of the system;
extracting an instantiation code from the electronic secure file; and
determining that the print engine is authorized only if additionally at least one of the one or more instantiation codes in the memory matches the instantiation code extracted from the electronic secure file.

4. The method of claim 1, further comprising, upon determining that the print engine is authorized:
calculating, by the controller, an estimated cost of a print job;
subtracting, by the controller, the estimated cost from a balance amount of the electronic secure file to generate a new balance amount;
updating, by the controller, the balance amount in the electronic secure file on the portable memory device with the new balance amount before causing the print engine to start the print job,
calculating, by the controller, an actual cost of the print job after causing the print engine to start the print job and upon completion of the print job; and
if the actual cost is different from the estimated cost,
adjusting, by the controller, the new balance amount to reflect the actual cost, and
replacing, by the controller, the electronic secure file on the portable memory device with a new electronic secure file;
wherein replacing the electronic secure file with the new electronic secure file comprising:
creating a new electronic secure file on the portable memory device,
retrieving from the portable memory device the creation date for the new electronic secure file,
setting the creation date and the balance amount in the new electronic secure file with the creation date for the new electronic secure file retrieved from the portable memory device and the new balance amount, respectively, and
deleting the electronic secure file from the portable memory device while keeping the new electronic secure file.

5. The method of claim 1 further comprising activating the portable memory device, using a computing device, by:
creating the electronic secure file on the portable memory device before retrieving data from the portable memory device;
retrieving the creation date associated with the electronic secure file from the portable memory device;

setting a balance amount of the electronic secure file; and
setting the creation date of the electronic secure file with the creation date associated with the electronic secure file retrieved from the portable memory device.

6. The method of claim 1 further comprising replenishing the portable memory device, using a computing device, by:
reading the electronic secure file stored on the portable memory device and extracting a balance amount from the electronic secure file;
determining a new balance amount based on the balance amount of the electronic secure file and a replenishment amount;
creating a new electronic secure file on the portable memory device;
retrieving from the portable memory device the creation date associated with the new electronic secure file;
setting the creation date and the balance amount of the new electronic secure file with the creation date for the new electronic secure file and the new balance amount, respectively; and
deleting the electronic secure file from the portable memory device while keeping the new electronic secure file.

7. A method of authenticating a print related job, comprising:
in a system having a print engine and a controller:
reading, by the controller, a portable memory device, wherein the portable memory device stores thereon an electronic secure file associated with a creation date and a vendor identification code,
retrieving, by the controller, from the portable memory device the creation date for the electronic secure file and the vendor identification code,
reading, by the controller, the electronic secure file from the portable memory device, and extracting a creation date and a vendor identification code from the electronic secure file,
comparing, by the controller, the creation date retrieved from the portable memory device with the creation date extracted from the electronic secure file,
comparing the vendor identification code retrieved from the portable memory device with the vendor identification code extracted from the electronic secure file, and
determining that the print engine is authorized if:
the creation date for the electronic secure file retrieved from the portable memory device matches the creation date extracted from the electronic secure file, and
the vendor identification code retrieved from the portable memory device matches the vendor identification code extracted from the electronic secure file, otherwise determining that the print engine is not authorized.

8. The method of claim 7, further comprising:
accessing one or more instantiation codes in a memory of the system;
extracting an instantiation code from the electronic secure file; and
determining that the print engine is authorized only if additionally at least one of the one or more instantiation codes in the memory matches the instantiation code extracted from the electronic secure file.

9. The method of claim 7, further comprising, upon determining that the print engine is authorized:
calculating, by the controller, an estimated cost of a print job;
subtracting, by the controller, the estimated cost from a balance amount of the electronic secure file to generate a new balance amount;
updating, by the controller, the balance amount in the electronic secure file on the portable memory device with the new balance amount before causing the print engine to start the print job;
calculating, by the controller, an actual cost of the print job after causing the print engine to start the print job and upon completion of the print job; and
if the actual cost is different from the estimated cost:
adjusting, by the controller, the new balance amount to reflect the actual cost, and
replacing, by the controller, the electronic secure file on the portable memory device with a new electronic secure file;
wherein replacing the electronic secure file with the new electronic secure file comprising:
creating a new electronic secure file on the portable memory device,
retrieving from the portable memory device the creation date for the new electronic secure file,
setting the creation date and the balance amount in the new electronic secure file with the creation date for the new electronic secure file retrieved from the portable memory device and the new balance amount, respectively, and
deleting the electronic secure file from the portable memory device while keeping the new electronic secure file.

10. The method of claim 7, further comprising activating the portable memory device, using a computing device, by:
creating the electronic secure file on the portable memory device before retrieving data from the portable memory device;
retrieving the creation date associated with the electronic secure file from the portable memory device;
setting a balance amount of the electronic secure file; and
setting the creation date of the electronic secure file with the creation date associated with the electronic secure file retrieved from the portable memory device.

11. The method of claim 7, further comprising replenishing the portable memory device, using a computing device, by:
reading the electronic secure file stored on the portable memory device and extracting a balance amount from the electronic secure file;
determining a new balance amount based on the balance amount of the electronic secure file and a replenishment amount;
creating a new electronic secure file on the portable memory device;
retrieving from the portable memory device the creation date associated with the new electronic secure file;
setting the creation date and the balance amount of the new electronic secure file with the creation date for the new electronic secure file and the new balance amount, respectively; and
deleting the electronic secure file from the portable memory device while keeping the new electronic secure file.

12. A method of authenticating a print related job in a system having a print engine and a controller, the method comprising:
reading, by the controller, a portable memory device, wherein the portable memory device stores thereon an electronic secure file associated with a creation date;

retrieving, by the controller, from the portable memory device the creation date for the electronic secure file;
reading, by the controller, the electronic secure file from the portable memory device, and extracting a creation date from the electronic secure file;
accessing one or more instantiation codes in a memory of the system;
extracting an instantiation code from the electronic secure file;
comparing, by the controller, the creation date retrieved from the portable memory device with the creation date extracted from the electronic secure file; and
determining that the print engine is authorized if:
the creation date for the electronic secure file retrieved from the portable memory device matches the creation date extracted from the electronic secure file, and
at least one of the one or more instantiation codes in the memory matches the instantiation code extracted from the electronic secure file;
otherwise determining that the print engine is not authorized.

13. The method of claim 12, further comprising, upon determining that the print engine is authorized:
calculating, by the controller, an estimated cost of a print job;
subtracting, by the controller, the estimated cost from a balance amount of the electronic secure file to generate a new balance amount;
updating, by the controller, the balance amount in the electronic secure file on the portable memory device with the new balance amount before causing the print engine to start the print job;
calculating, by the controller, an actual cost of the print job after causing the print engine to start the print job and upon completion of the print job; and
if the actual cost is different from the estimated cost:
adjusting, by the controller, the new balance amount to reflect the actual cost, and
replacing, by the controller, the electronic secure file on the portable memory device with a new electronic secure file;
wherein replacing the electronic secure file with the new electronic secure file comprising:
creating a new electronic secure file on the portable memory device,
retrieving from the portable memory device the creation date for the new electronic secure file,
setting the creation date and the balance amount in the new electronic secure file with the creation date for the new electronic secure file retrieved from the portable memory device and the new balance amount, respectively, and
deleting the electronic secure file from the portable memory device while keeping the new electronic secure file.

14. The method of claim 12, further comprising activating the portable memory device, using a computing device, by:
creating the electronic secure file on the portable memory device before retrieving data from the portable memory device;
retrieving the creation date associated with the electronic secure file from the portable memory device;
setting a balance amount of the electronic secure file; and
setting the creation date of the electronic secure file with the creation date associated with the electronic secure file retrieved from the portable memory device.

15. The method of claim 12, further comprising replenishing the portable memory device, using a computing device, by:
reading the electronic secure file stored on the portable memory device and extracting a balance amount from the electronic secure file;
determining a new balance amount based on the balance amount of the electronic secure file and a replenishment amount;
creating a new electronic secure file on the portable memory device;
retrieving from the portable memory device the creation date associated with the new electronic secure file;
setting the creation date and the balance amount of the new electronic secure file with the creation date for the new electronic secure file and the new balance amount, respectively; and
deleting the electronic secure file from the portable memory device while keeping the new electronic secure file.

16. A method of authenticating a print related job in a system having a print engine and a controller, the method comprising:
reading, by the controller, a portable memory device, wherein the portable memory device stores thereon an electronic secure file associated with a creation date;
retrieving, by the controller, from the portable memory device the creation date for the electronic secure file;
reading, by the controller, the electronic secure file from the portable memory device, and extracting a creation date from the electronic secure file;
comparing, by the controller, the creation date retrieved from the portable memory device with the creation date extracted from the electronic secure file;
determining that the print engine is authorized if the creation date for the electronic secure file retrieved from the portable memory device matches the creation date extracted from the electronic secure file, otherwise that the print engine is not authorized; and
upon determining that the print engine is authorized:
calculating, by the controller, an estimated cost of a print job,
subtracting, by the controller, the estimated cost from a balance amount of the electronic secure file to generate a new balance amount,
updating, by the controller, the balance amount in the electronic secure file on the portable memory device with the new balance amount before causing the print engine to start the print job,
calculating, by the controller, an actual cost of the print job after causing the print engine to start the print job and upon completion of the print job, and
if the actual cost is different from the estimated cost:
adjusting, by the controller, the new balance amount to reflect the actual cost, and
replacing, by the controller, the electronic secure file on the portable memory device with a new electronic secure file;
wherein replacing the electronic secure file with the new electronic secure file comprising:
creating a new electronic secure file on the portable memory device,
retrieving from the portable memory device the creation date for the new electronic secure file,
setting the creation date and the balance amount in the new electronic secure file with the creation date for the new electronic secure file retrieved from the portable memory device and the new balance amount, respectively, and deleting the electronic secure file from the portable memory device while keeping the new electronic secure file.

17. The method of claim 16, further comprising activating the portable memory device, using a computing device, by:

creating the electronic secure file on the portable memory device before retrieving data from the portable memory device;

retrieving the creation date associated with the electronic secure file from the portable memory device;

setting a balance amount of the electronic secure file; and setting the creation date of the electronic secure file with the creation date associated with the electronic secure file retrieved from the portable memory device.

18. The method of claim 16, further comprising replenishing the portable memory device, using a computing device, by:

reading the electronic secure file stored on the portable memory device and extracting a balance amount from the electronic secure file;

determining a new balance amount based on the balance amount of the electronic secure file and a replenishment amount;

creating a new electronic secure file on the portable memory device;

retrieving from the portable memory device the creation date associated with the new electronic secure file;

setting the creation date and the balance amount of the new electronic secure file with the creation date for the new electronic secure file and the new balance amount, respectively; and deleting the electronic secure file from the portable memory device while keeping the new electronic secure file.

19. A method of authenticating a print related job in a system having a print engine and a controller, the method comprising:

reading, by the controller, a portable memory device, wherein the portable memory device stores thereon an electronic secure file associated with a creation date;

retrieving, by the controller, from the portable memory device the creation date for the electronic secure file;

reading, by the controller, the electronic secure file from the portable memory device, and extracting a creation date from the electronic secure file;

comparing, by the controller, the creation date retrieved from the portable memory device with the creation date extracted from the electronic secure file;

determining that the print engine is authorized if the creation date for the electronic secure file retrieved from the portable memory device matches the creation date extracted from the electronic secure file, otherwise that the print engine is not authorized; and activating the portable memory device, using a computing device, by:

creating the electronic secure file on the portable memory device before retrieving data from the portable memory device, retrieving the creation date associated with the electronic secure file from the portable memory device, setting a balance amount of the electronic secure file, and setting the creation date of the electronic secure file with the creation date associated with the electronic secure file retrieved from the portable memory device.

20. The method of claim 19, further comprising replenishing the portable memory device, using a computing device, by:

reading the electronic secure file stored on the portable memory device and extracting a balance amount from the electronic secure file;

determining a new balance amount based on the balance amount of the electronic secure file and a replenishment amount;

creating a new electronic secure file on the portable memory device;

retrieving from the portable memory device the creation date associated with the new electronic secure file;

setting the creation date and the balance amount of the new electronic secure file with the creation date for the new electronic secure file and the new balance amount, respectively; and deleting the electronic secure file from the portable memory device while keeping the new electronic secure file.

* * * * *